US010713389B2

(12) United States Patent
Nicholson et al.

(10) Patent No.: US 10,713,389 B2
(45) Date of Patent: Jul. 14, 2020

(54) CONTROL INPUT FILTERING

(71) Applicant: Lenovo (Singapore) Pte. Ltd., Singapore (SG)

(72) Inventors: John Weldon Nicholson, Cary, NC (US); Aaron Michael Stewart, Raleigh, NC (US); Corinna Paine Proctor, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 135 days.

(21) Appl. No.: 14/174,967

(22) Filed: Feb. 7, 2014

(65) Prior Publication Data
US 2015/0227751 A1    Aug. 13, 2015

(51) Int. Cl.
*G06F 3/00*     (2006.01)
*G06F 21/62*    (2013.01)

(52) U.S. Cl.
CPC .... *G06F 21/629* (2013.01); *G06F 2221/2111* (2013.01); *G06F 2221/2149* (2013.01)

(58) Field of Classification Search
CPC ............ G07F 17/3211; G07F 17/3267; G07F 17/3209; G07F 17/3223; G07F 17/32; G07F 17/3227; G07F 17/323; G07F 17/3244; G07F 17/326; G07F 17/3262; G07F 17/3269; G07F 17/34; G07F 17/3206; G07F 17/3239
See application file for complete search history.

(56) References Cited

U.S. PATENT DOCUMENTS

| | | | |
|---|---|---|---|
| 6,359,661 B1 * | 3/2002 | Nickum | H04B 1/202 348/734 |
| 2008/0262849 A1 | 10/2008 | Buck et al. | |
| 2009/0079813 A1 | 3/2009 | Hildreth | |
| 2009/0183098 A1 * | 7/2009 | Casparian | G06F 3/04886 715/765 |
| 2009/0217211 A1 | 8/2009 | Hildreth et al. | |
| 2011/0026765 A1 | 2/2011 | Ivanich et al. | |
| 2011/0154266 A1 | 6/2011 | Friend et al. | |
| 2011/0224978 A1 | 9/2011 | Sawada | |
| 2012/0278729 A1 | 11/2012 | Vennelakanti et al. | |
| 2013/0127712 A1 | 5/2013 | Matsubayashi | |
| 2013/0194238 A1 * | 8/2013 | Sakai | H04N 21/4314 345/175 |
| 2014/0143149 A1 * | 5/2014 | Aissi | G06F 21/31 705/44 |

(Continued)

FOREIGN PATENT DOCUMENTS

EP    2579608 A1 *   4/2013   ....... H04N 21/43615

*Primary Examiner* — Di Xiao
(74) *Attorney, Agent, or Firm* — Ference & Associates LLC

(57) ABSTRACT

An aspect provides a method, including: accepting, at an input component of an information handling device, input of a user; identifying, using a processor, the input of the user as controlling input; determining, using a processor, one or more control factors associated with the controlling input; classifying, using a processor, the controlling input as a permissible control action for an application running on the information handling device based on the one or more control factors; and committing, using a processor, the permissible control action responsive to the classifying. Other aspects are described and claimed.

20 Claims, 3 Drawing Sheets

(56) References Cited

U.S. PATENT DOCUMENTS

| | | | |
|---|---|---|---|
| 2014/0208417 A1* | 7/2014 | Robison | G06F 21/32 726/19 |
| 2014/0354527 A1 | 12/2014 | Chen et al. | |
| 2014/0359651 A1* | 12/2014 | Lee | G06F 3/017 725/25 |
| 2015/0227209 A1* | 8/2015 | Nicholson | G06F 3/005 345/156 |
| 2015/0331490 A1 | 11/2015 | Yamada | |

* cited by examiner

CONTROL INPUT FILTERING

BACKGROUND

Information handling devices ("devices") come in a variety of forms, for example desktop or laptop computing devices, tablet computing devices, smart phones, smart televisions (TVs), gaming consoles, and the like. Natural user interfaces are increasingly being utilized to provide user inputs to such devices. For example, a natural user interface allows for multiple input modalities (such as camera/gesture inputs, audio/voice inputs, touch inputs, etc.) to be utilized for controlling applications running on such devices. Current examples of natural user interfaces and devices controllable therewith are gaming systems that accept voice and or gesture controlling inputs, such as Microsoft's XBOX KINECT system. XBOX KINECT is a trademark of Microsoft Corporation in the United States and other countries.

BRIEF SUMMARY

In summary, one aspect provides a method, comprising: accepting, at an input component of an information handling device, input of a user; identifying, using a processor, the input of the user as controlling input; determining, using a processor, one or more control factors associated with the controlling input; classifying, using a processor, the controlling input as a permissible control action for an application running on the information handling device based on the one or more control factors; and committing, using a processor, the permissible control action responsive to the classifying.

Another aspect provides an information handling device, comprising: an input component; a processor operatively coupled to the input component; a memory device that stores instructions accessible to the processor, the instructions being executable by the processor to: accept, at the input component, input of a user; identify the input of the user as controlling input; determine one or more control factors associated with the controlling input; classify the controlling input as a permissible control action for an application running on the information handling device based on the one or more control factors; and commit the permissible control action responsive to the classifying.

A further aspect provides a product, comprising: a storage device having code stored therewith, the code being executable by a processor and comprising: code that accepts input of a user; code that identifies the input of the user as controlling input; code that determines one or more control factors associated with the controlling input; code that classifies the controlling input as a permissible control action for an application running on the information handling device based on the one or more control factors; and code that commits the permissible control action responsive to the classifying.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
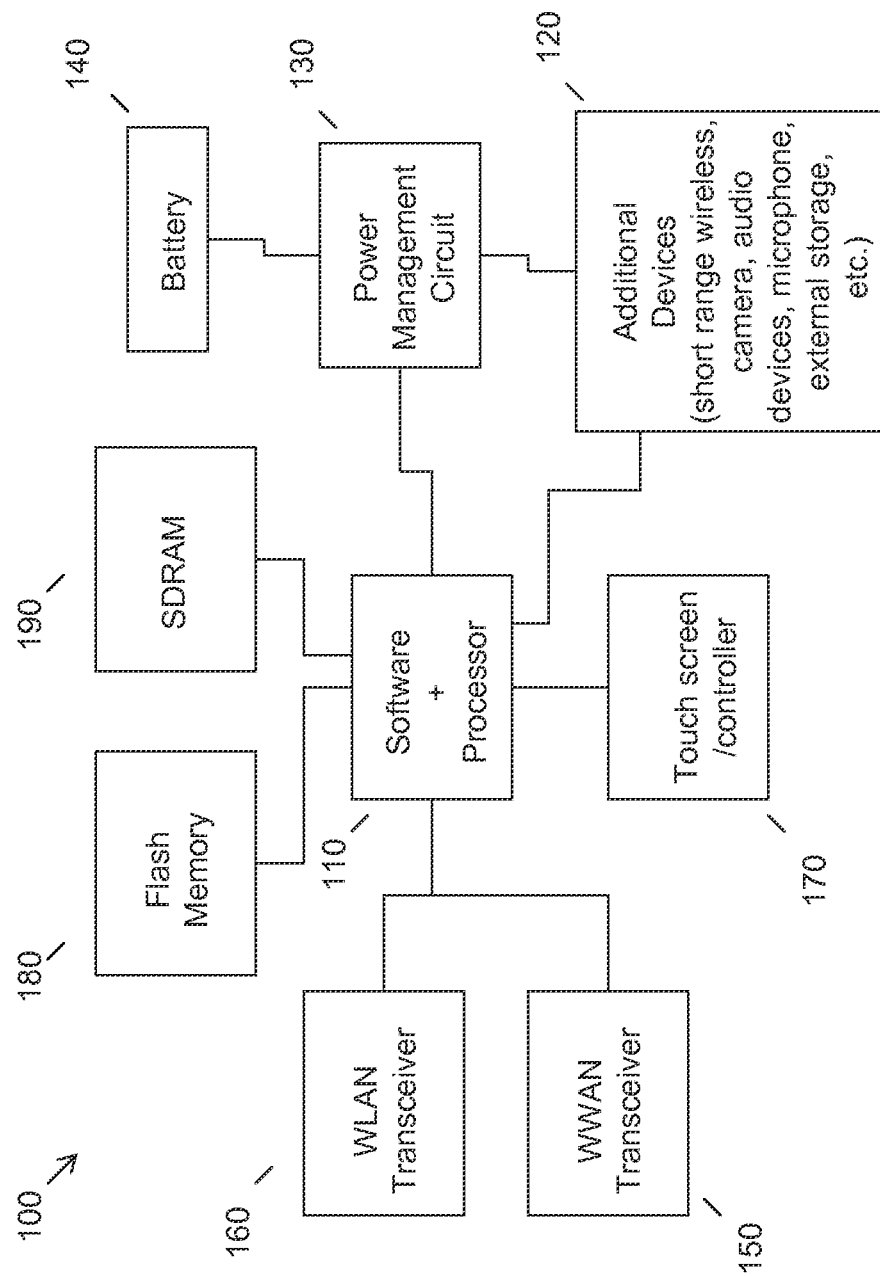
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While natural user interfaces are increasingly being utilized to provide user inputs, e.g., to gaming systems, smart televisions, etc., and while users enjoy the additional input modalities afforded thereby, a problem may arise in connection therewith. For example, in using a natural user interface to provide inputs, conventional systems do not typically discriminate between controlling inputs. That is, either a controlling input is received, identified, and executed or it is not. There is currently no attempt to distinguish if a command, although received and understood, should nonetheless be disregarded. Thus current/conventional natural user interface systems operate on the assumption that everyone (i.e., any user issuing a controlling input/command) is permitted to control the system.

In some cases, it may be beneficial to distinguish between users by way of a physical device, e.g., user holds a particular token and is thus permitted to issue controlling inputs. In other cases, it may be beneficial to distinguish between users by way of an authentication or login session such that a single, authenticated user maintains control. However, as will be appreciated from the description herein, each of the prior approaches has some drawbacks, not the least of which is inflexibility in switching between controlling users to accommodate dynamically changing scenes.

Accordingly, an embodiment provides a method for distinguishing between user control inputs (e.g., by virtue of a user's rank or priority) and responding to command/control inputs received on the basis thereof, e.g., executing some commands from priority users while filtering or disregarding commands issued from other, non-priority users.

In an embodiment, a method for filtering controlling inputs may include accepting, at an input component of a device, input of a user, such as voice and/or gesture inputs, and/or touch inputs (e.g., via a controller device), such as received via a natural user interface. An embodiment may identify the input of the user as controlling input, e.g., matched to an action available for controlling an application running on the device, such as adjusting the volume of a movie playing on a smart TV, etc.

Having identified a control input, however, an embodiment may additionally intelligently take into account if the control input should be executed. For example, an embodiment may determine one or more control factors associated with the controlling input, e.g., determining that the controlling input has been received from a particular user (such as a priority user, a currently assigned controlling user, a lower priority user, etc.). Given the control factor(s), which may include taking into account the nature of the command, an embodiment may therefore classify the controlling input as a permissible control action based on the one or more control factors. Thus, an embodiment may determine that a given controlling input is classified as being associated with a high priority user, is associated with a nature or type that it need not be from a high priority user, etc., based on the control factors.

In classifying the control action, an embodiment may thereafter commit a permissible control action to modify the behavior of the underlying application. Thus, if an embodiment determines that a control action has been issued from a currently assigned controlling user, the action may be committed. However, if the controlling input is received from a lower priority user, e.g., not the currently assigned controlling user, an embodiment may disregard the input unless the user issuing the control action gains control of the system, the command is permissible for a low priority user, etc. In this regard, an embodiment may dynamically/automatically re-assign controlling user status among a plurality of users, as further described herein.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet-like circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, such as a camera for receiving gesture inputs and/or a microphone for receiving audio inputs. System 100 may include a touch screen 170 for data input and display/rendering. System 100 also typically includes various memory devices, for example flash memory 180 and SDRAM 190.

Figure 2:
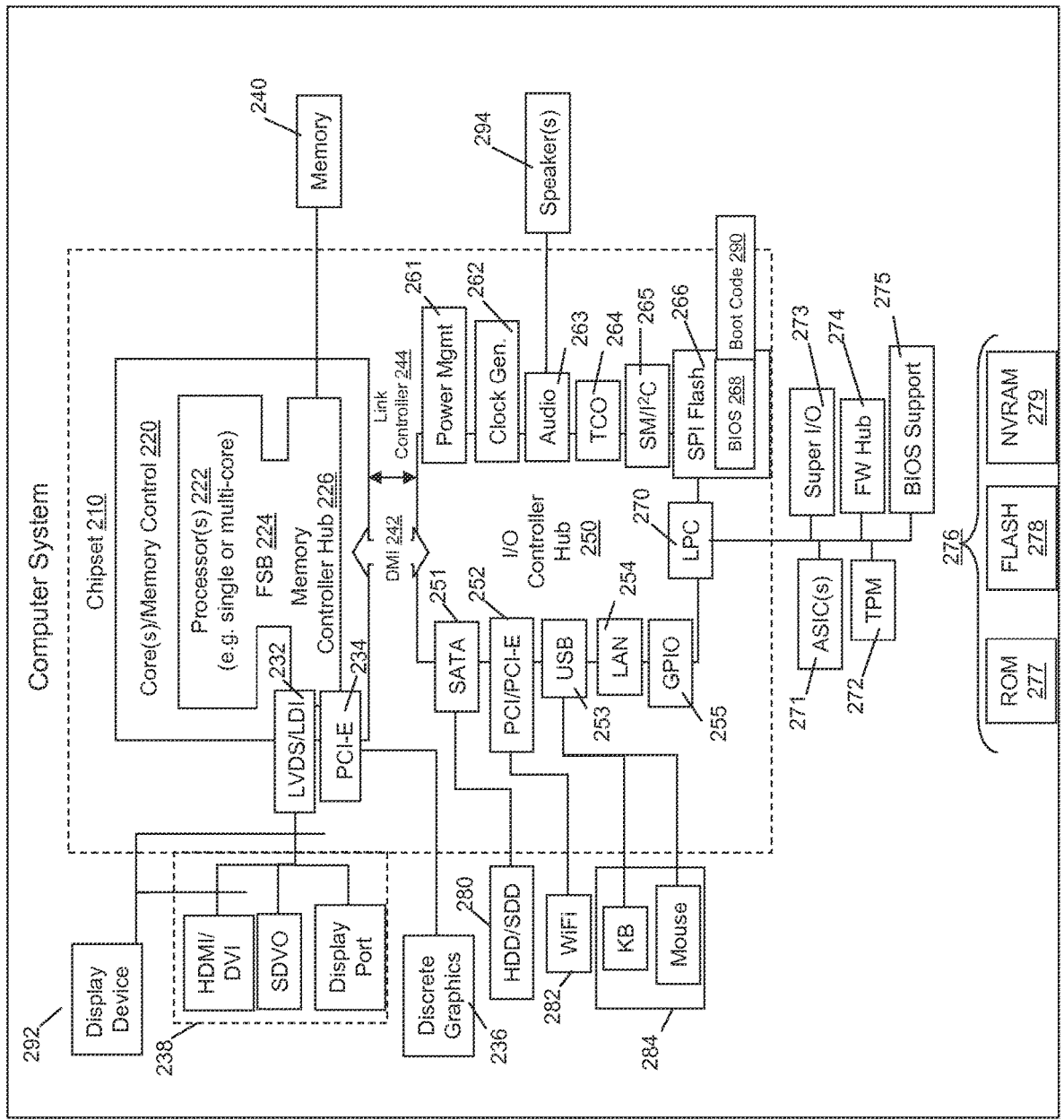
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as smart TVs, gaming consoles and other user devices that operate in concert with natural user interfaces, e.g., accepting user inputs such as gesture user inputs, voice commences, etc. As described herein, however, in certain situations simply faithfully identifying and executing natural user input controls/commands is inadequate. This may be particularly exacerbating in multi-user environments where inadvertently repeated inputs are issued by user(s) and/or conflicting controlling inputs are provided by different users either simultaneously or in rapid succession.

Figure 3:
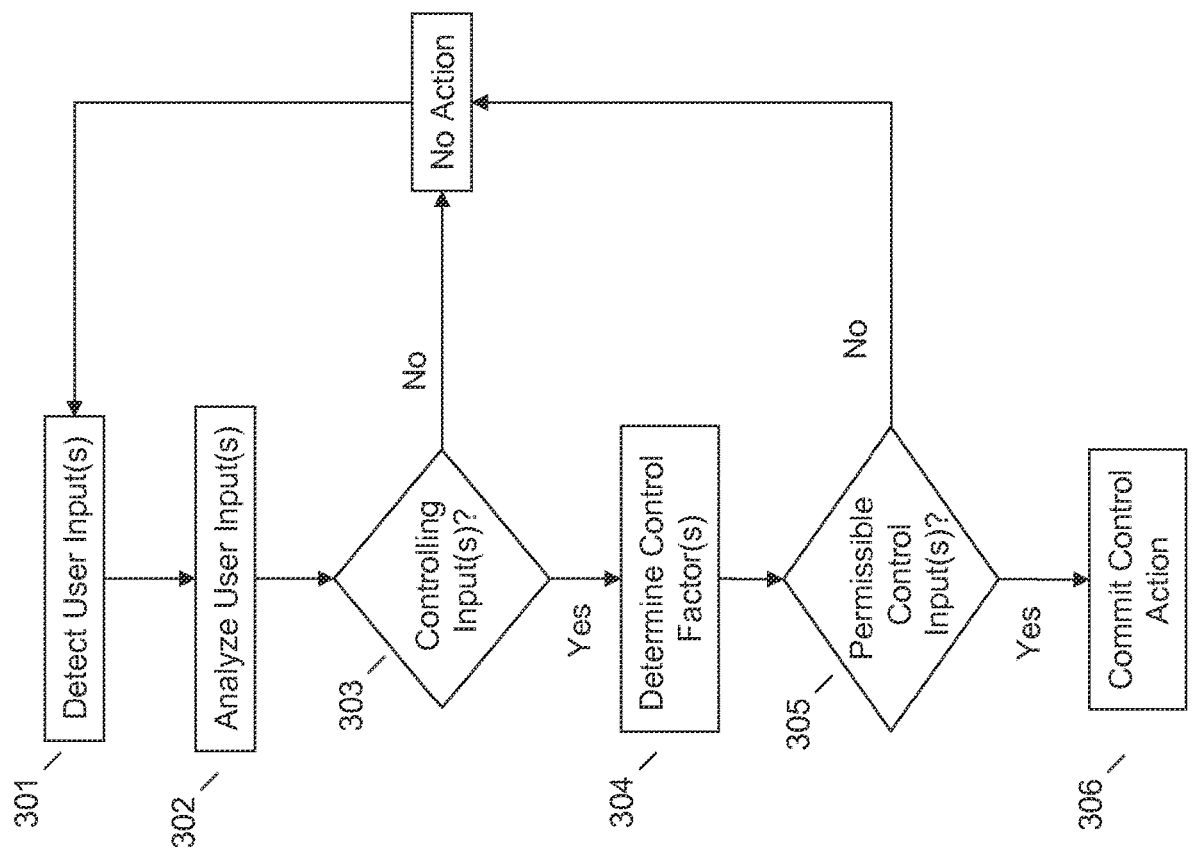
FIG. 3 illustrates an example of control input filtering.

Accordingly, referring to FIG. 3, an embodiment provides mechanisms to distinguish between controlling inputs issued by various users and thus implement intelligent control input filtering. An embodiment may accept/detect input of a user at 301, e.g., using a natural user input component such as a camera that detects gesture inputs and/or a microphone and speech recognition engine that detects voice commands. An embodiment may analyze the user inputs at 302, e.g., to identify the input of the user as including a controlling input. Thus, while an embodiment may continuously receive user inputs, e.g., detect user voices, capture user movements, these are analyzed at 302 to determine if any of the inputs map to controlling user inputs, e.g., volume up/down voice commands, gesture inputs mapped to application controls, etc.

If a controlling input is identified at 303, an embodiment may proceed to determine if no action should be take, e.g., input filtered, or if an action should be committed on the basis of the received controlling input. Of course, if no controlling input is identified at 303, e.g., only background noise or user movements not matched/mapped to control gestures, an embodiment may take no action and continue to detect user inputs in search of a controlling input.

If an embodiment does identify a controlling input at 303, an embodiment may determine at 304 one or more control factors associated with the controlling input. Control factors may include but are not necessarily limited to an explicit user setting, a user rank, a category of content processed by the application running on the information handling device, time of scene entry of a user, time, posture of a user, size characteristic of a user, audio characteristic of a user, location of a user, sequence of user inputs, control permission settings, and input modality.

For example, an embodiment may utilize control factors to determine which user has control over the system at 305. That is, an embodiment may determine, using various control factor(s) if the controlling input is a permissible controlling input at 305. By way of example, a control factor may include an explicit user setting (e.g., User A currently has control of the system) such that only controlling inputs (e.g., issued from User A in this example) are used to commit actions at 306, otherwise, no action may be taken even though a controlling input is identified. Therefore an embodiment may use user identification (e.g., via audio characteristics, etc.) to determine if an action should result from a particular controlling input.

Another example of a control factor is user rank (e.g., a priority metric for example based on experience or aptitude providing natural user interface commands, e.g., better recognition rate) or other like priority metric. Thus, only if a user above a predetermined priority (e.g., highest priority among three currently detected users) will the system execute a controlling action on the basis of that user's controlling input.

Another example of a control factor is the content or content category, e.g., of content displayed on screen or otherwise handled by the underlying application. By way of example, if a particular user is watching a favorite TV show, e.g., as assigned in settings to that user, that user may be assigned priority for controlling the system and have his or her controlling inputs assigned priority and classified as such.

Another example of a control factor is a time of entry on the scene (hysteresis). For example, when a user just enters the scene (e.g., enters the field of view of a camera of a natural user interface), if another user is already present, the prior user may retain control of the system or otherwise be assigned higher priority, and the new user may not automatically get control of the system. Thus, the new user may have to spend some time on the scene or otherwise deal with confirmation from current controller in order to have his or her controlling inputs honored.

Another example of a control factor is a time parameter, e.g., day of the week, time of day, etc. For example, certain users (e.g., children) may get priority during certain time slots (e.g., on Saturday morning); whereas other users (e.g., parents/adults) may get priority of control during other time slots (e.g., Friday evening and/or in association with time of favorite programs according to a program guide, etc.).

Another example of a control factor is posture (e.g., standing or sitting). Thus, a user standing may contextually be given priority over sitting users, e.g., while playing a game. Whereas sitting users may be given priority in other contexts, e.g., watching a movie.

Another example of a control factor is/are size attributes of the user issuing the controlling input. For example, an embodiment may use head size, stature and/or other indicators of age to assign priority (e.g., adults prioritized over children or vice versa). Similarly, vocabulary (e.g., word content) or other audio characteristic (e.g., using speaker recognition) may be utilized to identify particular users or user categories that are useful in making priority decisions (such as prioritizing adults/children, etc.).

Another example of a control factor includes location within the scene. For example, a user more centrally located in a field of view or as detected by stereo audio detection may be prioritized over users issuing commands from a peripheral portion of the scene.

It should be appreciated that the various control factors, such as the non-limiting examples described herein, may be used (either alone or in some suitable combination) to classify the controlling input as a permissible control action for an application running on the device based on the one or more control factors at 305. If the control input is determined to be permissible based on such classification, an embodiment may commit a permissible control action associated with or mapped to the control input responsive to the classifying at 306.

An embodiment may further dynamically switch the controlling user assignment such that a re-assignment of controlling user status may be effected. For example, a currently controlling user may be determined and thereafter controlling inputs from that user alone honored and used to commit actions, i.e., to the exclusion of other users' commands. An embodiment may, however, track the currently assigned controlling users such that, e.g., when that user is not detected (user leaves the room, gives up control, etc.), a next-highest priority user may gain control of the system and thus issue controlling commands that are honored and acted on. This process may proceed such that a back and forth re-assignment may be had, e.g., dynamically reassigning control of the system to the current highest-priority user based on the available context data, e.g., as determined via the one or more control factors.

Thus, an embodiment allows for a further refinement in which controlling inputs are to be honored and used to control the system, e.g., underlying application of the system. This permits users of various priorities to use the system in an organized fashion such that conflicting and/or repetitive commands issued form various users to not unnecessarily interfere with the collective enjoyment of the system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

accepting, at a natural user interface input component of an information handling device, input of a user within proximity of the natural user interface input component;

identifying, using a processor, the input of the user as controlling input, wherein the controlling input controls an application running on the information handling device;

determining that the controlling input comprises a permissible control action for an application running on the information handling device by determining that the user providing the controlling input has control over the application as compared to another user within proximity of the natural user interface input component providing controlling input, wherein the determining comprises classifying the controlling input based upon the nature of the controlling input, and, determining, from the classification, that the controlling input must be provided by a user having control over the application in order to commit the permissible control action;

the determining comprising (i) identifying the user and the another user, (ii) determining which of the user and the another user has control over the application utilizing one or more control factors associated with the controlling input, the control factors being previously set within the application and identifying a controlling user from between the user and the another user, who has control over the application and (iii) that the controlling input is provided by the controlling user, wherein the control factors are determined from natural user information obtained by the natural user interface input component;

committing, using a processor, the permissible control action; and re-assigning controlling user status to the another user upon no longer detecting the controlling user within proximity to the natural user interface input component.

2. The method of claim 1, further comprising assigning a controlling user.

3. The method of claim 2, wherein the one or more control factors associated with the controlling input comprises a currently assigned controlling user.

4. The method of claim 3, wherein the determining whether the controlling input comprises a permissible control action comprises determining if the input of the user is received from the currently assigned controlling user.

5. The method of claim 2, further comprising automatically reassigning a controlling user.

6. The method of claim 5, wherein the reassigning comprises switching an assignment of controlling user based on a user prioritization control factor.

7. The method of claim 1, wherein the accepting comprises accepting input of a user selected from the group consisting of gesture input, touch input, and voice input.

8. The method of claim 1, wherein the identifying comprises identifying the input of the user as input mapped to a predetermined controlling input for the application running on the information handling device.

9. The method of claim 1, wherein the determining one or more control factors comprises determining a control factor selected from the group consisting of an explicit user setting, a user rank, a category of content processed by the application running on the information handling device, time of scene entry of a user, time, posture of a user, size characteristic of a user, audio characteristic of a user, location of a user, sequence of user inputs, control permission settings, and input modality.

10. The method of claim 4, wherein the determining whether the controlling input comprises a permissible control action comprises mapping the controlling input to a permissible control action for the application running on the information handling device based on the one or more control factors.

11. An information handling device, comprising:
a natural user interface input component;
a processor operatively coupled to the input component;
a memory device that stores instructions accessible to the processor, the instructions being executable by the processor to:
accept, at the natural user interface input component, input of a user within proximity of the natural user interface input component;
identify the input of the user as controlling input, wherein the controlling input controls an application running on the information handling device;
determine that the controlling input comprises a permissible control action for an application running on the information handling device by determining that the user providing the controlling input has control over the application as compared to another user within proximity of the natural user interface input component providing controlling input, wherein to determine comprises to classify the controlling input based upon the nature of the controlling input, and, determining, from the classification, that the controlling input must be provided by a user having control over the application in order to commit the permissible control action;
to determine comprising (i) identifying the user and the another user, (ii) determining which of the user and the another user has control over the application utilizing one or more control factors associated with the controlling input, the control factors being previously set within the application and identifying a controlling user from between the user and the another user, who has control over the application and (iii) that the controlling input is provided by the controlling user, wherein the control factors are determined from natural user information obtained by the natural user interface input component;
commit the permissible control action; and
reassign controlling user status to the another user upon no longer detecting the controlling user within proximity to the natural user interface input component.

12. The information handling device of claim 11, wherein the instructions are further executable by the processor to assign a controlling user.

13. The information handling device of claim 12, wherein the one or more control factors associated with the controlling input comprises a currently assigned controlling user.

14. The information handling device of claim 13, wherein to determine whether the controlling input comprises a permissible control action comprises determining if the input of the user is received from the currently assigned controlling user.

15. The information handling device of claim 12, wherein the instructions are further executable by the processor to automatically reassign a controlling user.

16. The information handling device of claim 15, wherein reassign comprises switching an assignment of controlling user based on a user prioritization control factor.

17. The information handling device of claim 11, wherein to accept comprises accepting input of a user selected from the group consisting of gesture input, touch input, and voice input.

18. The information handling device of claim 11, wherein to identify comprises identifying the input of the user as input mapped to a predetermined controlling input for the application running on the information handling device.

19. The information handling device of claim 11, wherein to determine one or more control factors comprises determining a control factor selected from the group consisting of an explicit user setting, a user rank, a category of content processed by the application running on the information handling device, a time of scene entry of a user, time, posture of a user, a size characteristic of a user, an audio characteristic of a user, a location of a user, a sequence of user inputs, a control permission setting, and an input modality.

20. A product, comprising:
a storage device having code stored therewith, the code being executable by a processor and comprising:
code that accepts input of a user within proximity of a natural user interface input component, wherein the input of a user is provided via the natural user interface;
code that identifies the input of the user as controlling input, wherein the controlling input controls an application running on the information handling device;
code that determines that the controlling input comprises a permissible control action for an application running on the information handling device by determining that the user providing the controlling input has control over the application as compared to another user within proximity of the natural user interface input component providing controlling input, wherein the code that determines comprises code that classifies the controlling input based upon the nature of the controlling input, and, determining, from the classification, that the controlling input must be provided by a user having control over the application in order to commit the permissible control action;

the code that determines comprising code that (i) identifies the user and the another user, (ii) determines which of the user and the another user has control over the application utilizing one or more control factors associated with the controlling input, the control factors being previously set within the application and indicating a controlling user from between the user and the another user, who has control over the application and (iii) that the controlling input is provided by the controlling user, wherein the control factors are determined from natural user information obtained by the natural user interface input component;

code that commits the permissible control action; and code that reassigns controlling user status to the another user upon no longer detecting the controlling user within proximity to the natural user interface input component.

* * * * *